Sept. 24, 1968     G. DURST     3,402,637
SHARP FOCUSING DEVICE FOR ENLARGER
Filed April 22, 1966     4 Sheets-Sheet 1
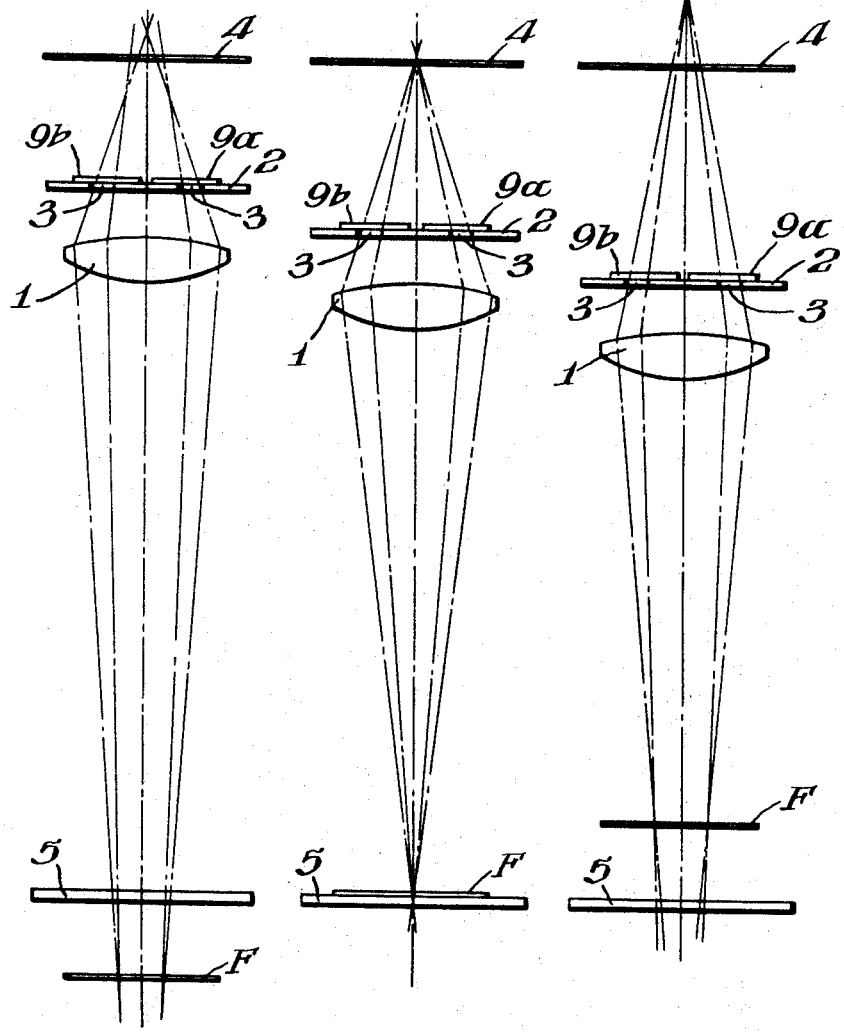
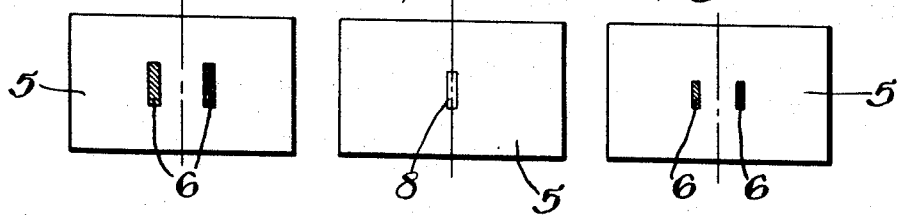

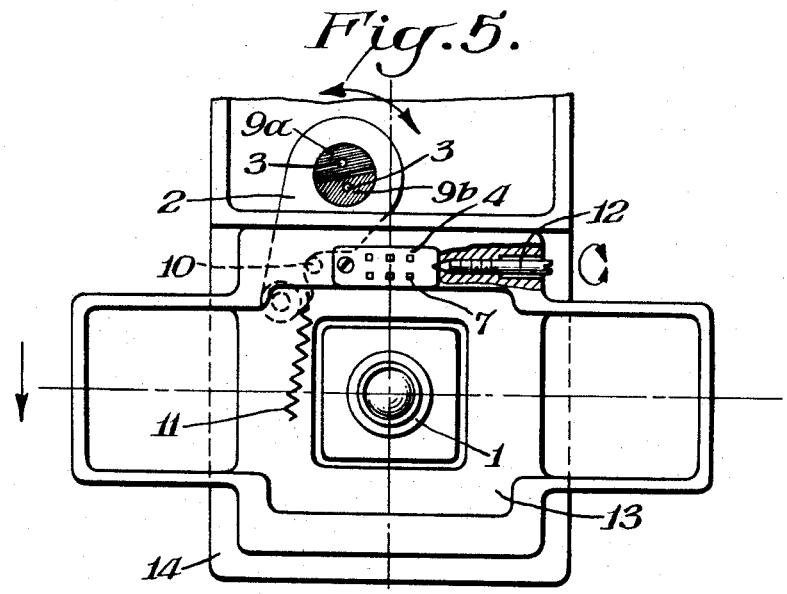
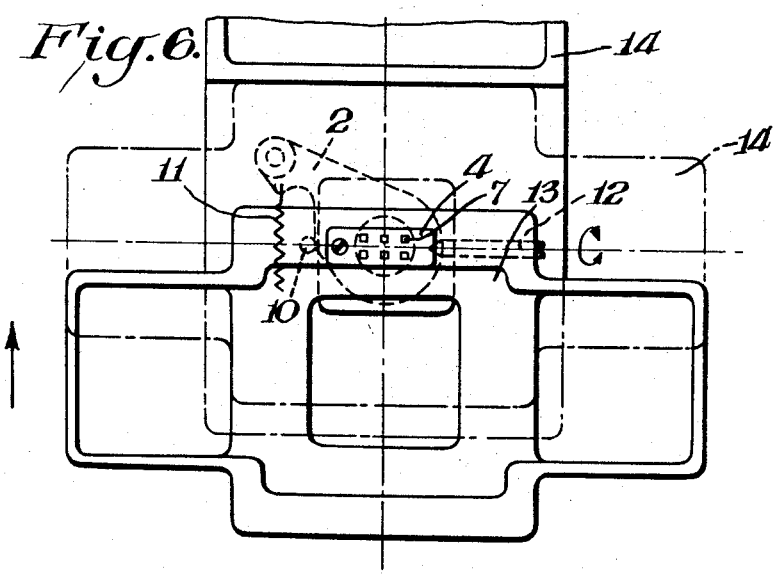
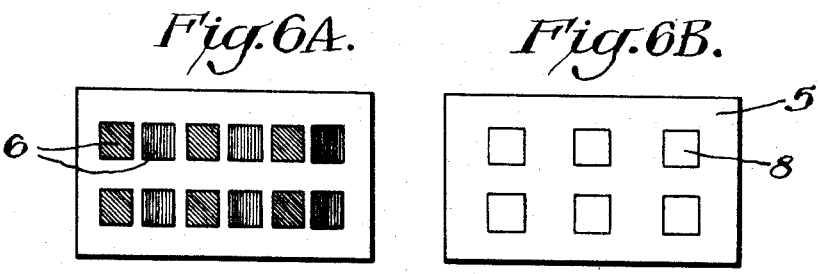

United States Patent Office 3,402,637
Patented Sept. 24, 1968

3,402,637
SHARP FOCUSING DEVICE FOR ENLARGER
Gilbert Durst, Brixen, near Bozen, Italy, assignor to Durst A.G. Fabrik Fototechnischer Apparate, Bozen, Italy
Filed Apr. 22, 1966, Ser. No. 544,611
Claims priority, application Italy, Dec. 17, 1965, 27,714/65
5 Claims. (Cl. 88—24)

This invention relates to a sharp focusing device, and more particularly to such a device for use in copying machines and enlargers.

For various reasons, simple enlargers in which the sharp focusing of the image is done manually require an auxiliary sharp focusing device, so that laymen or inexperienced amateurs using the enlargers are able to focus the image quickly and surely. Therefore, sharp focusing devices of varying cost have become known, which make the cheap amateur apparatus considerably more expensive and which, in addition, do not always operate reliably.

An object of this invention is to provide a sharp focusing device that is economical, simple in design and of a less complicated nature, so that a minimum of precision adjustments are needed.

A further object of this invention is to design a sharp focusing device that may be easily adapted to any enlargement apparatus.

Still a further object of this invention is to provide a sharp focusing device that is independent of the focal length of the objective.

Still another object is to provide a sharp focusing device whereby the focusing is equally easy at all focal distances and not merely long or short focal lengths.

In accordance with this invention the focusing device consists essentially of a double slitted diaphragm placed in front of or in back of the objective, which produces splitting of a projected image. This double slitted diaphragm has two juxtaposed openings by which the image of the negative or test negative projected by the objective is split into two partial images on the image receiving plane. When the objective is in focus, these partial images are exactly superimposed; when it is not in sharp focus, they are merely next to each other. Thus, in order to achieve sharp focusing, it is necessary to bring the objectives toward or away from the negative or test negative, until the two sharp partial images merge into a single one. A portion of a picture negative that is rich in contrast can also be used to achieve the above focusing process.

The accuracy of the focusing adjustment can still be further increased, in accordance with this invention, by placing a suitable test mark in the plane of the negative, or the test mark in some cases may replace the negative where the negative lacks sharp markings. For example, a test mark built into the negative holder is projected twice as a light line by this system. It then becomes very easy to unite these two lines into a single line by displacing the objective, thereby accurately focusing the image. In order to further increase the sharpness of the two test lines, complementary colored filter disk, for example one red and the other green, are placed on the diaphragm disk, thereby resulting in colored test lines. When the objective is not in sharp focus, one sees a green and a red line displaced adjacent to each other; hence the position of optimal focusing is reached by moving the objective toward the position of sharp focusing, thereby the two complementary colored lines move toward each other and merge into a single white line free of colored edges. The diaphragm disk is simply disconnected like a usual swingable red filter during the enlargement operation.

The most favorable position of the diaphragm disk for the splitting of the beams can be adjusted by the coaxial displacement of the objective focal distance or objective aperture. The sharp focusing is preferably accomplished at full objective aperture. A test object built into the negative holder needs only to be adjusted once at the desired level or in the position of the negative that is to be enlarged. A very simple, safe-to-use test mark consists of a small, thin spring-actuated plate. This plate is located at the edge of the negative holder and can be brought into the plane of the negative by a minute screw adjustment. This screw adjustment places the test mark in the desired position.

In a more advantageous fashion, the beam splitting diaphragm disk is coupled with the negative holder, the beam splitting diaphragm disk is connected simultaneously when the test mark is brought forward over the optical axis. It is disconnected when the test mark is removed. In a very cheap form of an apparatus, the beam splitting diaphragm can also be attached in place of the usual red filter. The conventional lamp of the enlarger serves as light source for the illumination of the test mark.

Novel features and advantages of the present invention will become apparent to one skilled in the art from a reading of the following description in conjunction with the accompanying drawings wherein similar reference characters refer to similar parts, and in which:

FIGS. 1–3 are diagrammatical views illustrating the principle of beam splitting in accordance with this invention;

FIGS. 1A–3A illustrate the focal patterns resulting from the processes of FIGS. 1–3;

FIG. 5 is a fragmental plan view of an enlarger incorporating the focusing device of FIG. 4;

FIG. 6 is a fragmental plan view of the enlarger of FIG. 5 showing an applicational position thereof in phantom outline;

Figure 4:
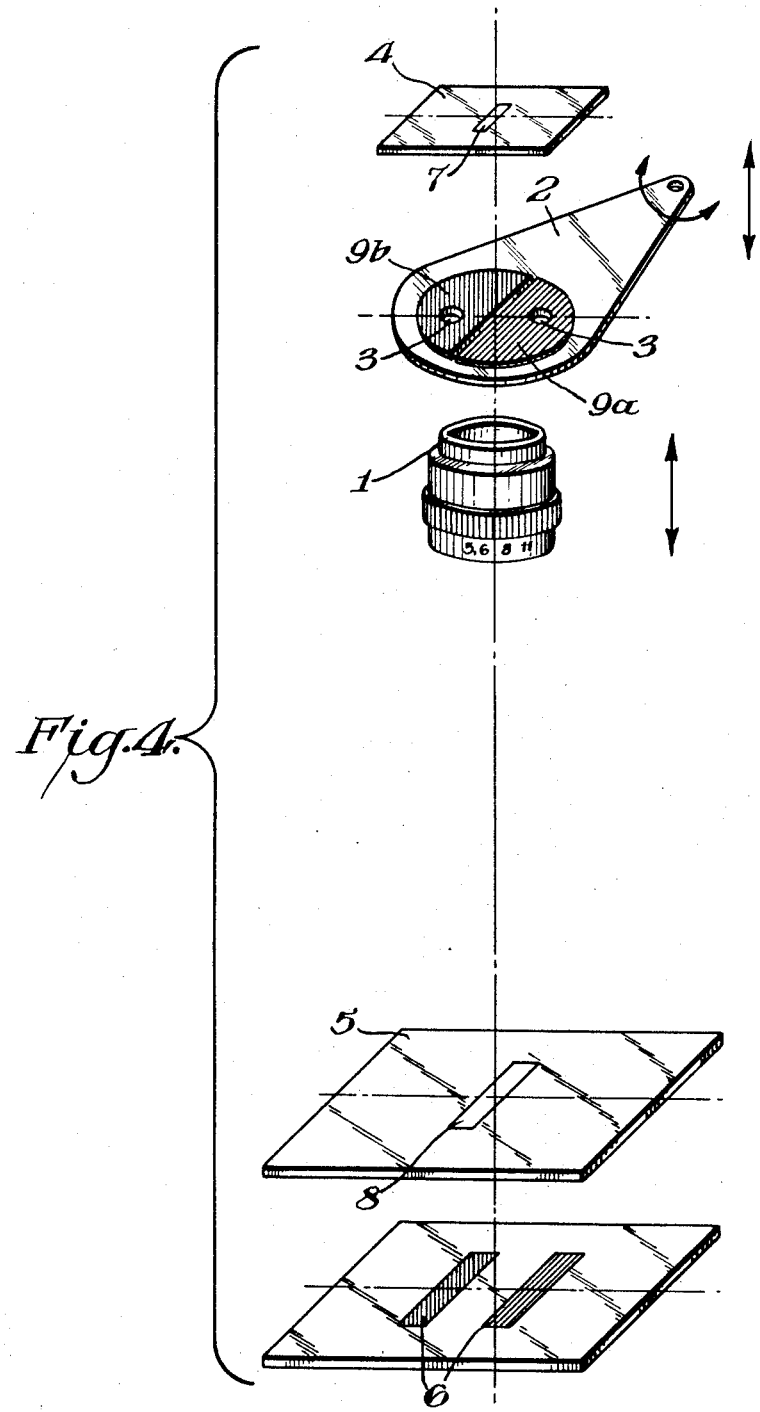
FIG. 4 is an exploded view of the beam splitting components and its corresponding in and out of focus patterns formed in accordance with this invention.
Figure 7:
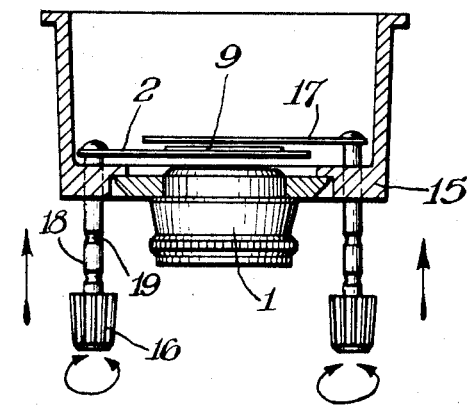
Figure 8:
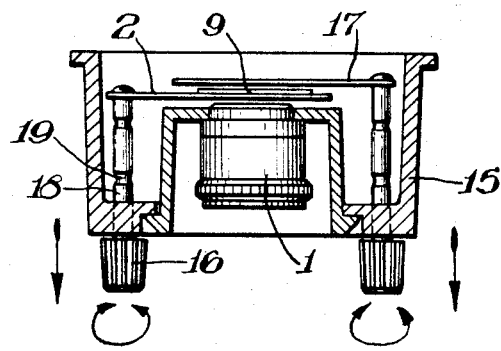
Figure 9:
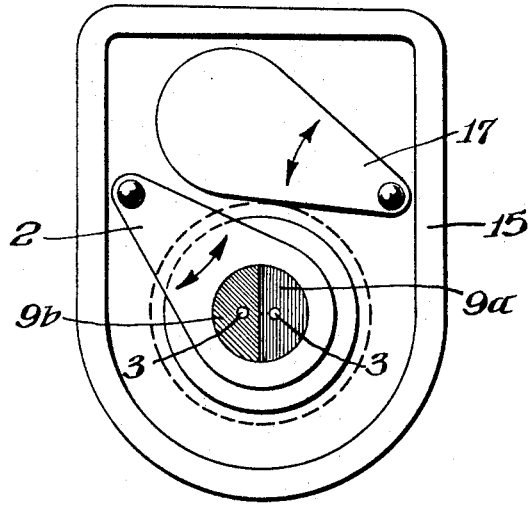

FIG. 6A and 6B respectively show out of and in focus patterns resulting from the enlarger of FIG. 6;

FIG. 7 is a sectional view of one arrangement of an objective lens used in accordance with this invention;

FIG. 8 is a sectional view of an alternate arrangement of the objective lens; and FIG. 9 is a top plan view of the objective holder for the lens of FIGS. 7 and 8.

Referring now to the drawing, FIGS. 1 thru 4 show a test mark 7 that can consist of a slit, and which is placed in the plane of the negative 4. The illuminating lamp of the enlarger, which is not shown, illuminates the test mark 7, so that the objective 1 projects the slit-shaped lighted opening 7 onto the receiving plane of the enlarger 5 in the plane of sharp focusing F when the objective is sharply adjusted. In FIG. 1 the objective 1 is too close to the negative plane 4 for the image distance of the image plane 5, i.e., is not in sharp focus, the beams of the partial images obtained by inserting the beam splitting diaphragm disk 2 juxtaposed openings 3 result in divided light beams crossing at F below the receiving plane 5. Therefore, the test mark 8 appears on the receiving plane 5 as a double image 6 as seen in FIG. 1A.

If on the other hand, as in FIG. 3, the objective 1 is too far from the negative plane 4, the intersection of the divided light beams of rays takes place at F above the receiving plane 5. Therefore, one sees on the receiving plane 5 two unsharp light beam lines located next to each other 6 as shown in FIG. 3A.

The visibility quality is still further increased by the use of the two filters, a red one 9a and a green one 9b, shown in FIGS. 1 thru 3. In case of an unsharp adjustment, the two complementary colored lines 6 are located next to each other; as seen in FIG. 1A and FIG. 3A, they merge into a single white line 8 as shown in FIG. 2 when the correct sharp focusing is achieved.

FIG. 5 shows the retracted diaphragm disk 2 provided with the two filters 9a and 9b and the openings 3, whereby the negative holder 13 is inserted in the enlarger 14. The test mark 4 built in the negative holder 13 carries, for example, several small openings 7 to allow the light to pass through. The test mark 4 consists of a small thin plate which is attached on one side by means of a screw or pin and is elevated or lowered by turning the screw 12 until the test mark 4 is exactly in the position of the negative film in the holder 13. The test mark 4 adjustment need be made only once. If one withdraws the negative holder 13, as shown in FIG. 6, until the test mark 4 is above the objective 1, the beam splitting diaphragm disk 2, urged by the spring 11 follows the motion of the negative holder 13 until it comes into resting contact with the fitting lug 10 exactly above the objective 1.

FIG. 6A and FIG. 6B respectively show an out of focus and in focus test pattern. FIG. 7 is an illustration of an objective carrying piece in sectional elevation without the negative holder 13. The objective carrying piece 15 of the apparatus 14 has the inserted objective 1 with normal focal distance $f$ together with the rotatable knob 16 used for the control of the diaphragm disk 2, in case the spring tension 11 is not used.

FIG. 8 shows a sectional elevation of an alternate way of mounting the objective 1 for a shorter focal distance. As shown therein, a shaft 18 is shifted vertically by applying a force on turning knob 16. This thereby places and locks (by means of cams 19) the diaphragm disk 2 in the most favorable position near the posterior lens of the objective 1. The usual red filter 17, normally used in an enlarger with the same activating device, is also shown in FIGS. 7 and 8.

Obviously, many modifications and variations of the present invention are possible in the light of the above teachings. It is, therefore, to be understood that within the scope of the appended claims the invention may be practiced otherwise than as specifically described.

What is claimed is:

1. A sharp focusing device for disposing a beam splitting diaphragm in the optical axis of an object for use in enlargement apparatus, characterized in that said beam splitting diaphragm is located near the objective said diaphragm being provided with two juxtaposed openings, a negative holder, a test negative built in to said holder, coupling means connecting said diaphragm to said test negative whereby said diaphragm is automatically disposed in said optical axis when said test negative is placed over said objective.

2. A device according to claim 1, wherein a test mark is disposed on said test negative.

3. A device according to claim 1, wherein two ray filters, one red and one green, are disposed over said two juxtaposed openings in said beam splitting diaphragm.

4. A device according to claim 1, wherein said coupling means comprises a pivot means for said diaphragm, resilient means reacting between said diaphragm and said negative holder for causing said diaphragm to move in accordance with the movement of said negative holder.

5. A device according to claim 1, wherein said beam splitting diaphragm is provided with adjusting means for coaxially aligning said diaphragm and said object.

References Cited

UNITED STATES PATENTS

| | | | |
|---|---|---|---|
| 2,595,495 | 5/1952 | Von Berg et al. | 88—24 |
| 2,826,957 | 3/1958 | Klatt | 88—24 |
| 2,851,919 | 9/1958 | Nesvadba | 88—24 X |

NORTON ANSHER, *Primary Examiner.*

RICHARD A. WINTERCORN, *Assistant Examiner.*